Nov. 14, 1961     F. T. KURT     3,008,209
MAGNETIC FASTENER
Filed Nov. 28, 1958     2 Sheets-Sheet 1
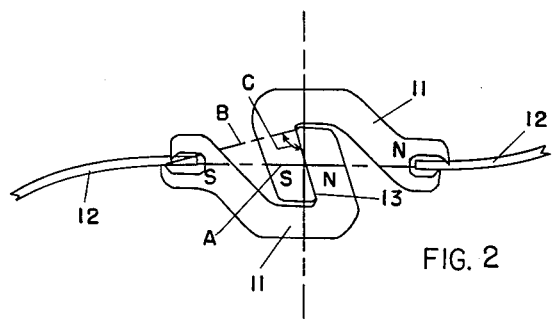
FIG. 2
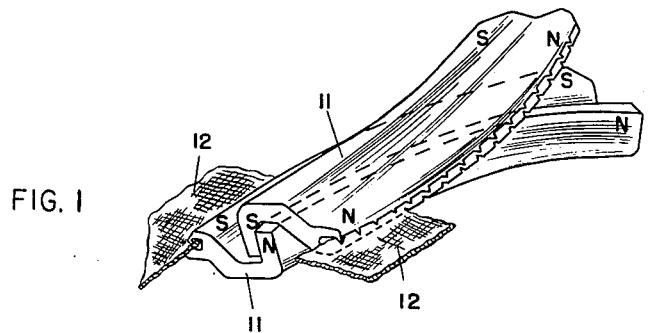
FIG. 1
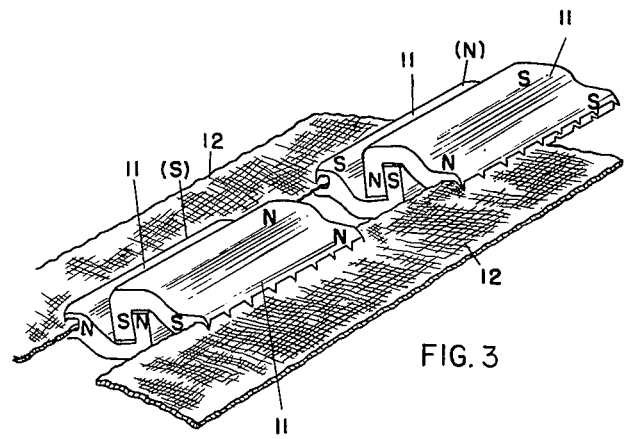
FIG. 3
INVENTOR.
FRANKLIN T. KURT
ATTORNEY Nov. 14, 1961 F. T. KURT 3,008,209
MAGNETIC FASTENER
Filed Nov. 28, 1958 2 Sheets-Sheet 2
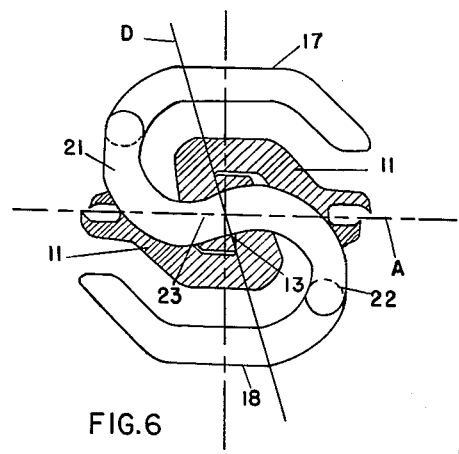
FIG. 6
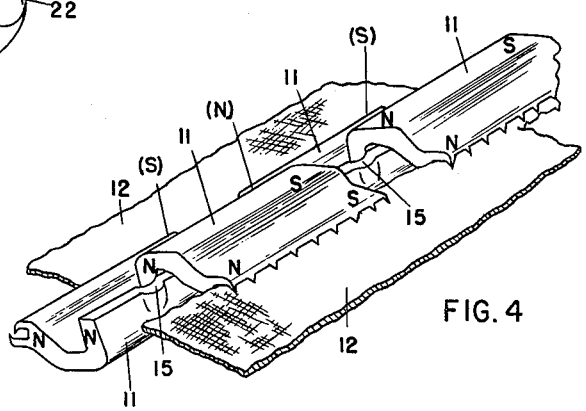
FIG. 4
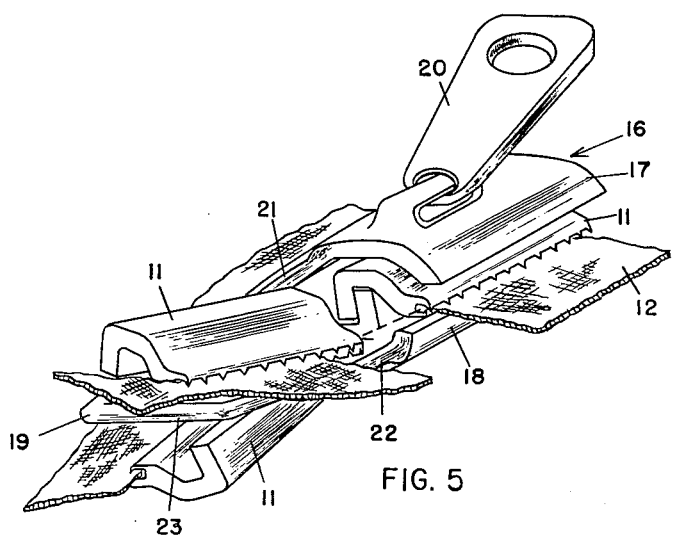
FIG. 5
INVENTOR.
FRANKLIN T. KURT
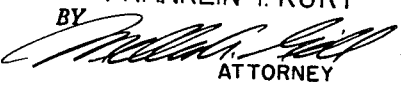
BY
ATTORNEY ns Patent Office 3,008,209
Patented Nov. 14, 1961

3,008,209
MAGNETIC FASTENER
Franklin T. Kurt, Southdown Road, Huntington, N.Y.
Filed Nov. 28, 1958, Ser. No. 777,123
6 Claims. (Cl. 24—203)

This invention relates to fasteners and more particularly to fasteners for clothing and the like which are engaged and maintained in engaged position by magnetic attraction.

The principal object of this invention is to provide a continuous closure of the general type known as a "zipper" which will be non-fouling and which cannot jam or become inoperative by engaging foreign material between the elements thereof.

A further object is to provide on each edge of an opening identically hook shaped elements which are magnetically polarized and so shaped that tension forces across the opening cause the hook elements to engage more tightly.

A further object is to provide an extremely easy opening and closing fastener whether used with or without a slider or guide.

A further object is to provide an extremely strong closure resistant to the forces of closure and ruggedly resistant to damage through mishandling.

A further object is to provide a fastener characterized by its simplicity and economy of manufacture.

Other objects of the invention, as well as the advantages thereof, will become apparent from the following description taken in conjunction with the accompanying drawings, in which:

FIG. 1 is a perspective view of one embodiment of the invention;

FIG. 2 is an end view thereof;

FIG. 3 is a perspective view of another embodiment;

FIG. 4 is a perspective view of still another embodiment;

FIG. 5 is a perspective view of a further embodiment provided with a slider or guide; and FIG. 6 is an enlarged cross-sectional view showing the slider located over the engaged hook elements.

Referring to FIGS. 1 and 2, the embodiment shown therein comprises a pair of identically shaped hook elements 11 in the form of continuous magnetized srtips of substantially U-shaped cross-section. These hook elements may be made as extrusions or as wires with a U-shaped cross-section or they may be machined or otherwise fabricated in such manner to afford a flexible element of length corresponding to that of the opening to be closed.

As shown, one leg of each hook element 11 is secured along an edge of the opening in the material 12, while the other legs are adapted to engage one another in overlapped relationship. Although shown as being crimped to the material 12, no significance is to be given to such means of attachment for the hook elements may be secured to the material 12 by stitching, clamping, bonding or any other suitable means.

It will be noted that although the hook elements 11 in this particular embodiment are of identical shape, their magnetization or polarization is of opposite sense. That is, one hook element is magnetized such that the leg which is secured to the material 12 is a north-seeking pole as indicated by the letter N and the overlapping leg of that hook element is a south-seeking pole as indicated by the letter S, while the other hook element is magnetized such that the leg which is secured to the material 12 is a south-seeking pole as indicated by the letter S and the overlapping leg of that hook element is a north-seeking pole as indicated by the letter N. The overlapping legs are thereby magnetically attracted to one another to thereby maintain the hook elements in the engaged position.

With particular reference to FIG. 2, it will be noted that any pulling or tension forces exerted across the opening will pass along the horizontal center-line A and directly through the mating faces 13 of the overlapping legs. As shown, the mating faces 13 are sloped and are of sufficient depth so that the force line B connecting the point of attachment of the material 12 to the hook element with the end of the overlapping leg of the same hook element forms with the mating faces 13 an obtuse angle C. This geometry is deemed desirable so that the tension forces across the opening will tend to keep the hooks engaged. It is recognized that if this principle is preserved, the cross-sectional shape of the hook elements 11, although remaining substantially U-shaped, may vary from that shown depending on the nature of the material, tooling, and manufacturing methods used.

Referring now to FIG. 3, the embodiment shown therein comprises a plurality of separate hook elements 11 spaced in pairs directly opposite to each other across the opening in the material 12. The same form of magnetic polarity shown in FIG. 1 may be used or each hook element 11 may be magnetized as shown by the letters N and S so that the entire end of each hook element is a north-seeking pole and its opposite end is a south-seeking pole. Thus, in each pair the north-seeking end of each hook element is attracted to and engaged with the south-seeking end of the opposite or mating hook element. Although all hook elements on one side of the opening may be of identical polarity, it is deemed preferable to provide the hook elements with magnetization such that adjacent ends of adjacent hooks are of like polarity as shown. Thus, adjacent hook elements on either side of the opening repel one another to prevent folds or other irregularities in the material 12 that might otherwise be induced if non-mating adjacent links attracted each other.

The embodiment shown in FIG. 4 comprises a plurality of separate hook elements 11 spaced in staggered relation to each other. Here again, the same form of magnetic polarity shown in FIG. 1 may be used or each hook element 11 may be magnetized as shown by the letters N and S so that the entire end of each hook element is a north-seeking pole and its opposite end is a south-seeking pole. The hook elements are spaced in such manner that the north-seeking end of a hook element on one side of the opening is attracted to and engaged with the south-seeking end of a hook element secured to the opposite side of the opening, while the south-seeking end of the first mentioned hook element is attracted to and engaged with the north-seeking end of a hook element on the opposite side of the opening and adjacent to the second mentioned hook element. In such manner any one hook element bridges two adjacent hook elements on the opposite side of the opening.

As an alternative to such magnetization, the hook elements on one side of the opening may be unmagnetized in which event they function as a "keeper" or neutral bridge and secure their attraction to the magnetized hook elements on the opposite side of the opening by providing a flux path therethrough and to the pole ends of the magnetized hook elements.

In order to obtain more accurately the correct staggered relationship of each hook element to one another, a projection or indentation 15 as shown may be provided at the middle portion of each hook element.

From the above, it will be seen that the strength of the attachment or closure is in no way dependent on the magnetic attraction, which force is used solely to keep the hooks engaged when they are free, unloaded, and not being pulled by the two sides of the garment or fabric being attached. Thus if a foreign body comes between any two hook elements it merely holds them apart or forces them apart by overcoming their magnetic attraction. It is only necessary for the user to remove the unwanted foreign body whereupon the attachment is immediately ready to engage in the normal way.

In order to secure the fastener, the user introduces any hook element to its mate on the opposite side of the opening in a manner that permits the hooks to engage. Presumably, this first operation will be done at one end of the opening or seam, although it may be started at any point. As soon as the first elements are manipulated into an approximate mating position the magnetic attraction will complete the engagement. Thereafter the attachment will continue down the seam with a minimum of guidance by the user. He merely brings the two edges of the garment or fabric to be joined into approximate alignment, such as pulling the opening straight, and the mating hook elements will seek closure with each other.

When all the hook elements are mated and the seam is closed, the garment may be shaken, twisted or distorted and stressed in any manner, but the attachment will not open because the tension and magnetic forces hold it together. Compression forces cannot be generated to separate the fastener because the material or cloth will not support such forces.

To open the fastener the user manipulates the hook elements at one end of the seam and forces them apart an amount sufficient to overcome the magnetic attraction. He then passes any solid object, such as his own finger, between the next mated hook elements and so on down the seam, splitting it apart for its entire length.

Referring now to FIGS. 5 and 6, a slider or guide 16 is shown in conjunction with the embodiment of this invention as described hereinabove with reference to FIG. 3. It is to be noted, however, that although so shown, such slider is equally applicable to the other embodiments of this invention. As shown, the slider 16 comprises upper and lower caps 17 and 18 rigidly and integrally connected together by a splitter-bar 19 and provided on the upper cap 17 thereof with an operating tang 20. Although not shown, the tang 20 may include a lug for the purpose of retaining or stopping the fastener in a partially open or closed position by insertion between any two adjacent hook elements.

The splitter-bar 19 comprises two legs 21 and 22 and an interconnecting segment 23 which is spaced from the caps 17 and 18 a distance sufficient to permit the hook elements 11 to move into and out of engagement. The interconnecting segment 23 is positioned approximately at right angles to the slope of the mating faces 13 of the hook elements 11 for the purpose of forcing them apart along the line D, all as shown in FIG. 6. It is obvious that the caps 17 and 18 will guide the hook elements 11 into engagement when the slider 16 is moved in one direction, while the splitter-bar 19 will force them apart along the line D against their magnetic attraction when the slider 16 is moved in the other direction.

The basic feature of this slide is that it is made extremely loose and free in contrast to the tight fitting slides on mechanical interlocking zippers which is the principal cause of their jamming and fouling. This extreme freedom and clearance is possible because the mating hook elements need to be brought only sufficiently close together for the magnetic forces to attract them in order to complete the engagement. This extreme freedom is limited only by the dimensions required to prevent the slider from falling off the assembly altogether, that is, the caps 17 and 18 must be slightly closer together than the combined thickness of the mated hook elements.

This freedom or looseness of fit will provide a gap many times greater than even a multiple number of folds of the fabric so that even a relatively large pile-up of fabric or foreign body that could come between the hook elements and the slider will not jam, it being noted that the slider is loose enough to permit all the looseness or freedom on one side at a time.

The application of the fastener comprising the present invention may be to any form of fabric, cloth, cover, garment, apparel, tarpaulin, bag, container, or other device, which requires closure along a seam and attachment of opposing edges thereof. In large, heavy material such as canvas and outdoor applications the continuous strip or wire form shown in FIGS. 1 and 2 is deemed best. In lighter applications, particularly garments which require folding more compactly than would be permitted by the continuous wire form, the individual hook links is deemed best, while in extremely light materials so flexible that they will not prevent the opposite polarity links from attracting each other when folded, the opposed hook links shown in FIG. 3 may prove best because the adjacent links will repel each other.

Although shown and described in what is believed to be the most practical and preferred embodiments, it is apparent that departures therefrom will suggest themselves to those skilled in the art and may be made without departing from the spirit and scope of the invention. I therefore do not wish to restrict my self to the particular forms of construction illustrated and described, but desire to avail myself of all modifications that may fall within the scope of the appended claims.

Having thus described my invention, what I claim is:

1. A fastener comprising a plurality of identically shaped hook elements of substantially U-shaped cross-section, one leg of approximately one-half of said hook elements being secured to and uniformly spaced along an edge of an opening, one leg of the other of said hook elements being secured to the opposite edge of said opening and spaced therealong such that the other legs of said one-half of said hook elements each engage in overlapping relationship two of the other legs of said other hook elements, said hook elements being composed of magnetizable material and being magnetized such that one end thereof is a north-seeking pole and its opposite end is a south-seeking pole and such that the north-seeking pole end of substantially all of said hook elements secured to one edge of said opening engage the south-seeking pole ends of said hook elements secured to the opposite edge of said opening.

2. A fastener as set forth in claim 1 wherein the middle portions of each of said overlapping legs are provided with indentations.

3. A fastener comprising a plurality of identically shaped hook elements of substantially U-shaped cross-section, one leg of approximately one-half of said hook elements being secured to and uniformly spaced along an edge of an opening, one leg of the other of said hook elements being secured to the opposite edge of said opening and spaced therealong such that the other legs of said one-half of said hook elements each engage in overlapping relationship two of the other legs of said other hook elements, said hook elements being composed of magnetizable material and being magnetized to provide magnetic attraction between said overlapping legs.

4. A fastener as set forth in claim 3 wherein the opposite ends of each of said hook elements are of opposite polarity.

5. A fastener for attachment to oppositely disposed edges of an opening comprising at least one U-shaped hook element secured along one leg thereof to one edge of said opening, at least two other U-shaped hook elements each secured along one leg thereof to the opposite edge of said opening and spaced therealong such that the other leg of each of said first mentioned hook elements engage in overlapping relationship two of the other legs of said second mentioned hook elements, said hook elements being composed of magnetizable material and at least two of said hook elements being magnetized to provide magnetic attraction between said overlapping legs.

6. A fastener as set forth in claim 5 wherein the middle portions of each of said overlapping legs are provided with indentations.

References Cited in the file of this patent

UNITED STATES PATENTS

| | | |
|---|---|---|
| 1,691,999 | Statham | Nov. 20, 1928 |
| 2,389,298 | Ellis | Nov. 20, 1945 |
| 2,461,201 | Ellis | Feb. 8, 1949 |
| 2,615,227 | Hornik | Oct. 28, 1952 |
| 2,627,097 | Ellis | Feb. 3, 1953 |
| 2,648,884 | Loofboro | Aug. 18, 1953 |
| 2,809,411 | Moghadam | Oct. 15, 1957 |
| 2,959,832 | Baermann | Nov. 15, 1960 |

FOREIGN PATENTS

| | | |
|---|---|---|
| 322,222 | Switzerland | July 31, 1957 |
| 360,974 | France | May 9, 1906 |